United States Patent [19]

Iwasaki et al.

[11] Patent Number: 5,489,964
[45] Date of Patent: Feb. 6, 1996

[54] CAMERA

[75] Inventors: Hiroyuki Iwasaki; Masaru Muramatsu, both of Kawasaki; Tadao Takagi, Yokohama, all of Japan

[73] Assignee: Nikon Corporation, Tokyo, Japan

[21] Appl. No.: 334,121

[22] Filed: Nov. 4, 1994

[30] Foreign Application Priority Data

Nov. 8, 1993 [JP] Japan .................................. 5-278546
Nov. 8, 1993 [JP] Japan .................................. 5-278547

[51] Int. Cl.$^6$ .................................................. G03B 7/08
[52] U.S. Cl. .................................................... 354/432
[58] Field of Search ..................................... 354/429, 431, 354/432; 356/222

[56] References Cited

U.S. PATENT DOCUMENTS 4,978,990 12/1990 Yamasaki et al. ...................... 354/432
5,227,830 7/1993 Yoshihara et al. .................. 354/432 X
5,373,345 12/1994 Goto ....................................... 354/432

FOREIGN PATENT DOCUMENTS

1-225927  9/1989  Japan .

Primary Examiner—W. B. Perkey

[57] ABSTRACT

A camera is provided with an exposure arithmetic apparatus for patterning a field to calculate an amount of exposure. The exposure arithmetic apparatus has a light amount measuring portion for measuring amounts of light for a plurality of segmental zones of the field, a pattern generating portion for generating a plurality of patterns for spatially pattern-classifying the field, a correlation arithmetic portion for calculating correlation values each indicating a degree of correlation of each pattern with the field, based on outputs from the light amount measuring portion and the pattern generating portion, a pattern luminance calculating portion for performing an arithmetic process based on an output from the pattern generating portion, of the output from the light amount measuring portion, and an exposure arithmetic portion for calculating correct exposure, based on outputs from the correlation arithmetic portion and pattern luminance calculating portion.

10 Claims, 12 Drawing Sheets

FIG. 4A  WAL (0, n)

FIG. 4B  WAL (1, n)

FIG. 4C  WAL (2, n)

FIG. 4D  WAL (3, n)

FIG. 4E  WAL (4, n)

FIG. 4F  WAL (5, n)

FIG. 4G  WAL (6, n)

FIG. 4H  WAL (7, n)

| ss00  | ss10  | ss20  | ss30  | ss40  |
| --- | --- | --- | --- | --- |
| ss01  | ss11  | ss21  | ss31  | ss41  |
| ss02  | ss12  | ss22  | ss32  | ss42  |
| ss03  | ss13  | ss23  | ss33  | ss43  |
| ss04  | ss14  | ss24  | ss34  | ss44  |

CAMERA

BACKGROUND OF THE INVENTION

1. Field of the Invention

The present invention relates to a camera provided with an exposure arithmetic apparatus, and more particularly to a camera provided with an exposure arithmetic apparatus for calculating an amount of exposure while patterning a field to be photographed.

2. RELATED BACKGROUND ART

The cameras provided with an exposure arithmetic apparatus are conventionally well known and an example of the exposure arithmetic apparatus for calculating an amount of exposure while patterning the field is one disclosed in Japanese Laid-open Patent Application No. 1-225927.

Figure 13:
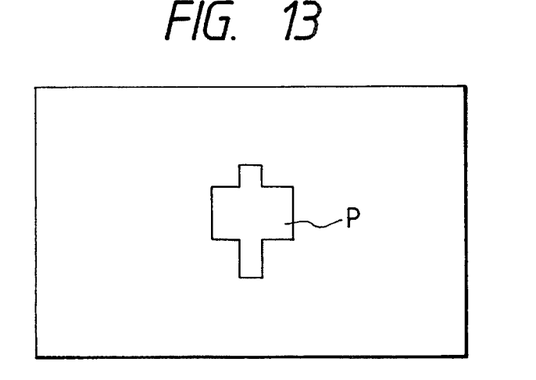
FIG. 13 is an explanatory drawing to show an image pattern in the conventional technology.

The exposure arithmetic apparatus as disclosed in this application is so arranged that a plurality of outputs of light amount data measured are binarized, the binarized data is compared with an image pattern P preliminarily stored as shown in FIG. 13, and matched data is recognized as a main object to perform further processing.

The exposure arithmetic apparatus mounted in conventional cameras, however, had a problem that it was very difficult to binarize outputs of light amount data measured.

Figure 14:
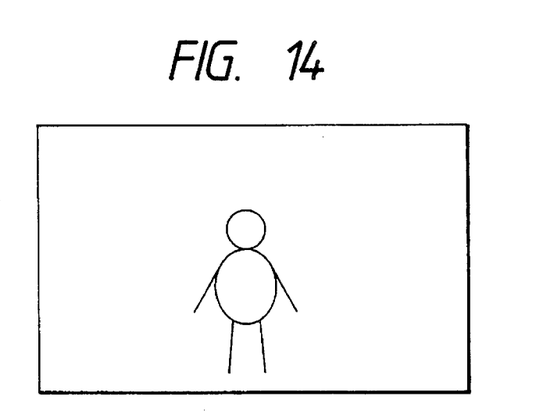
FIG. 14 is an explanatory drawing to show a field of a simple composition.
Figure 15:
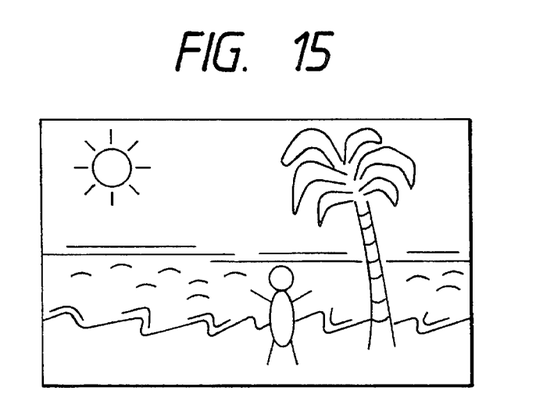
FIG. 15 is a drawing to show a field of a complex composition.

Namely, no problem occurs for fields of a simple composition, for example, as shown in FIG. 14, but binarizing of field becomes very difficult for fields of a somewhat complicated composition, for example, as shown in FIG. 15, resulting in meeting difficulties in patterning of field.

Another problem was as follows. Since the field patterning depends on the preliminarily stored image patterns, patterning is possible for stored image patterns, but impossible for patterns not stored so as to result in failing to recognize a subject.

Then, in order to pattern a lot of types of images, the number of types of image patterns to be stored inevitably increases in proportion, which could impose loads on memory or operation time.

SUMMARY OF THE INVENTION

The present invention has been accomplished to solve such conventional problems, and an object of the invention is to provide an exposure arithmetic apparatus which can easily pattern a field of any photographic scene and can provide an accurate amount of correct exposure, based on the patterning.

To achieve the above object, according to the present invention, a camera provided with an exposure arithmetic apparatus is provided, wherein the exposure arithmetic apparatus comprises: a light amount measuring device for measuring an amount of light for each of a plurality of segmental zones in a field; a pattern generating device for generating a plurality of patterns for spatially pattern-classifying the field; a correlation arithmetic device for calculating correlation values, each representing a degree of correlation of the each pattern with the field, based on outputs from the light amount measuring device and the pattern generating device; a pattern luminance calculating device for performing an arithmetic process based on the output from the pattern generating device, of the output from the light amount measuring device; and an exposure arithmetic device for performing an arithmetic operation of correct exposure, based on outputs from the correlation arithmetic device and the pattern luminance calculating device.

Preferably, the exposure arithmetic device obtains pattern exposure values which are correct exposure values in the respective patterns, using the luminance values in the respective patterns obtained by the pattern luminance calculating device, and obtains a correct exposure value by multiplying the respective pattern exposure values by the correlation values obtained by the correlation arithmetic device.

The light amount measuring device preferably performs measurement of light amount by a storage-type light amount measuring element.

Preferably, the pattern generating device generates patterns based on the two-dimensional Walsh transform.

Also, according to the present invention, a camera provided with an exposure arithmetic apparatus is provided, wherein the exposure arithmetic apparatus comprises: a light amount measuring device for measuring an amount of light for each of a plurality of segmental zones in a field; a spectrum analyzing device for performing spectrum analysis of the field using an output from the light amount measuring device; and an exposure arithmetic device for performing an arithmetic operation of correct exposure based on outputs from the light amount measuring device and the spectrum analyzing device; wherein the spectrum analyzing device performs spectrum analysis of the field, using a specific number of spectrum values preliminarily selected from a plurality of spectrum values determined depending upon a number of segmental zones in the light amount measuring device.

The light amount measuring device preferably performs measurement of light amount by a storage-type light amount measuring element.

Also, the light amount measuring device preferably performs measurement of light amount while splitting the field in a matrix of segmental zones.

Further, the light amount measuring device preferably employs a power of 2 for at least one of a number of horizontal segments and a number of vertical segments of the field split in the matrix.

Preferably, the spectrum analyzing device performs spectrum analysis based on the two-dimensional Walsh transform.

The specific number of spectrum values preliminarily selected by the spectrum analyzing device are preferably spectrum values mainly in a low frequency region.

The above and other objects, features and advantages of the present invention are explained hereinafter and may be better understood by reference to the drawings and the descriptive matter which follows.

BRIEF DESCRIPTION OF THE DRAWINGS

FIG. 10 is comprised of FIGS. 10A and 10B illustrating flowcharts to show a subroutine algorithm in step S104 in FIG. 9;

DETAILED DESCRIPTION OF THE PREFERRED EMBODIMENTS

Figure 1:
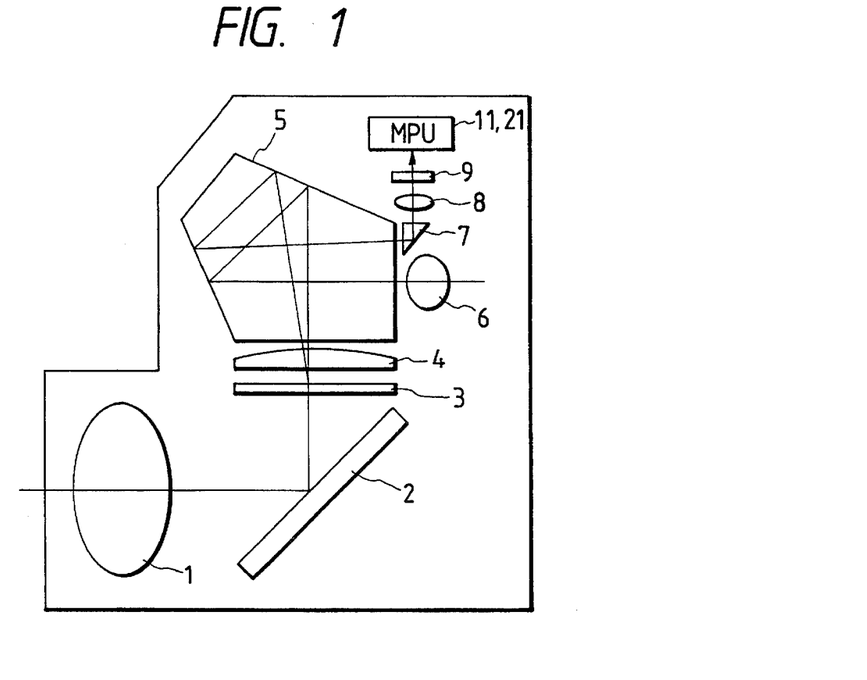
FIG. 1 is an explanatory drawing to show an optical system in a camera of the present invention.
Figure 2:
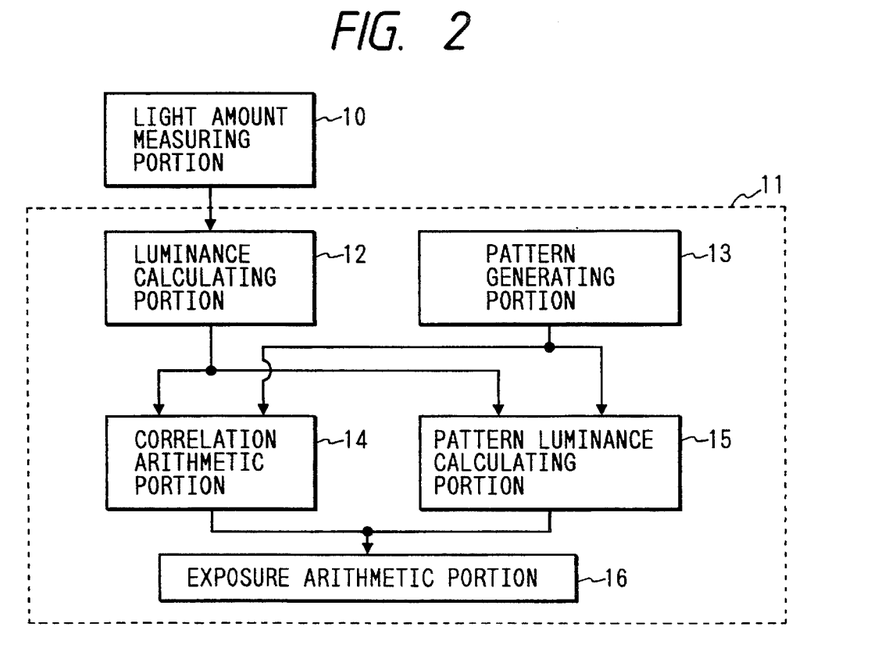
FIG. 2 is a block diagram to show the structure of the first embodiment of the exposure arithmetic apparatus mounted in the camera shown in FIG. 1.

FIG. 1 shows an optical system in a single-lens reflex camera according to the present invention, and FIG. 2 is a block diagram of the first embodiment of the exposure arithmetic apparatus mounted in the camera shown in FIG. 1.

In the optical system shown in FIG. 1, the light having passed through a taking lens 1 travels via a quick return mirror 2, a diffusion screen 3, a condenser lens 4, a pentagonal prism 5, and an eyepiece lens 6 to reach the photographer's eye.

On the other hand, part of light diffused by the diffusion screen 3 travels via the condenser lens 4, the pentagonal prism 5, a metering prism 7, and a metering lens 8 to reach a storage-type light amount measuring element 9.

The exposure arithmetic apparatus of this embodiment is composed, as shown in FIG. 2, of a light amount measuring portion 10 for measuring an amount of light in a field and a micro processing unit (MPU) 11 set in the camera.

The light amount measuring portion 10 has the optical system shown in FIG. 1, which performs measurement of light amount for each of 64 zones in the field as divided in a matrix of 8 vertical segments and 8 horizontal segments to supply outputs of respective metered data to a luminance calculating portion 12.

Figure 3:
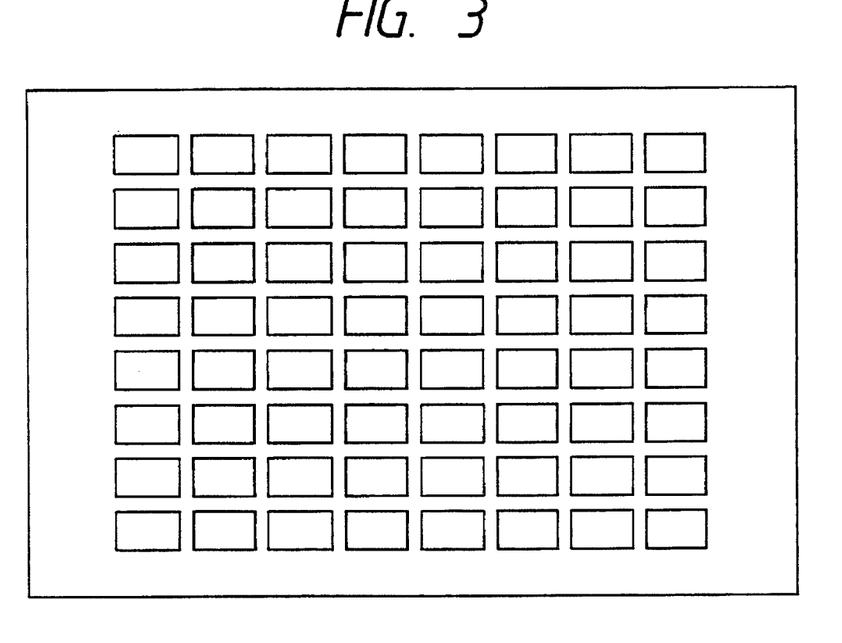
FIG. 3 is an explanatory drawing to show a state of separation of a light amount measuring element in the exposure arithmetic apparatus of FIG. 2.
Figure 4A:
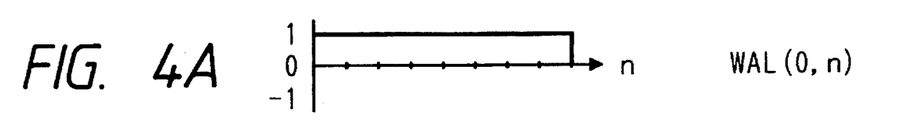
FIGS. 4A to 4H are explanatory drawings to show an example of one-dimensional Walsh functions.
Figure 4B:
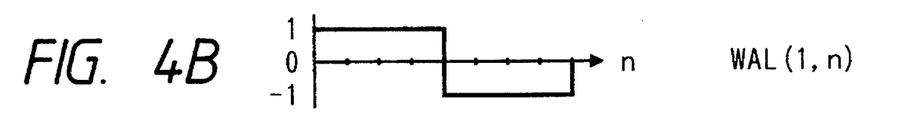
Figure 4C:
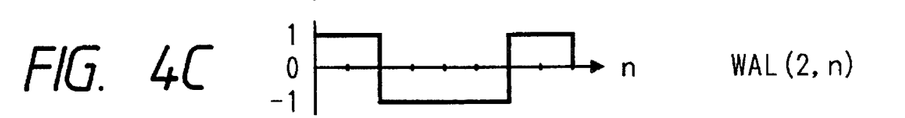
Figure 4D:
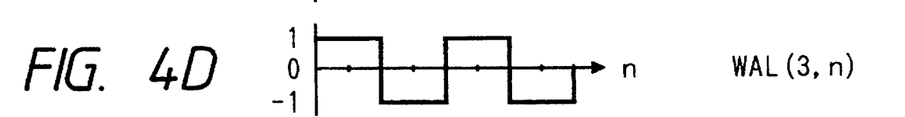
Figure 4E:
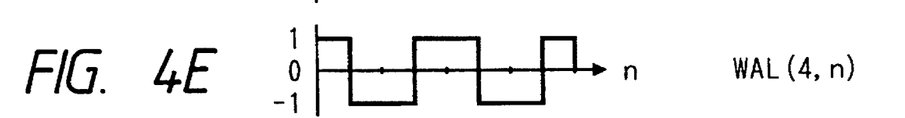
Figure 4F:
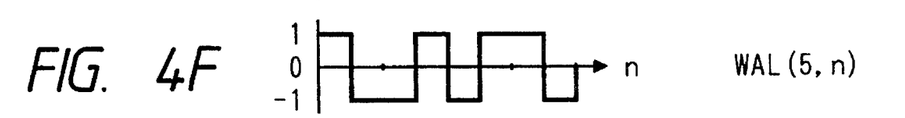
Figure 4G:
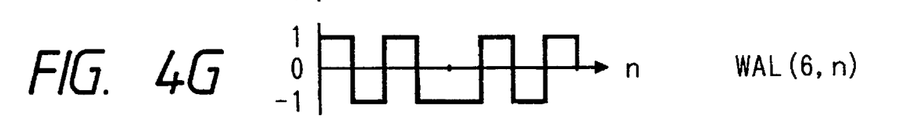
Figure 4H:
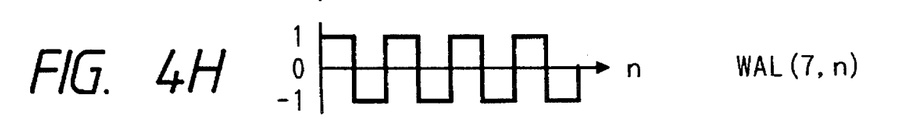

FIG. 3 is a drawing to show a state of separate metering zones of the light amount measuring portion 10 by comparison on the field, in which the field is split into 64 zones in a matrix of 8 vertical segments and 8 horizontal segments.

MPU 11 performs all controls in the camera by the program written therein. In the present embodiment, the luminance calculating portion 12, pattern generating portion 13, correlation arithmetic portion 14, pattern luminance calculating portion 15, and exposure arithmetic portion 16 all are realized by the program in MPU 11.

The luminance calculating portion 12 takes in light amount data of the zones obtained by the light amount measuring portion 10 to convert the 64 light amount data into respective luminance values and then to put them into bv (h, v), (where h=0 to 7 and v=0 to 7).

Here, bv (0, 0) represents a luminance value of the left upper end zone in FIG. 3 and bv (7, 7) a luminance value of the right lower end zone.

The pattern generating portion 13 generates patterns based on the two-dimensional Walsh transform.

Here is described the two-dimensional Walsh transform.

Generally, the two-dimensional Walsh transform is defined as extension of the one-dimensional Walsh transform, which is applied to two-dimensional data such as image data and is used in pattern recognition, image analysis, etc.

In particular, it is called as two-dimensional discrete Walsh transform for the cases handling two-dimensional discrete data such as the light amount data, but the specification simply uses the two-dimensional Walsh transform for brevity.

The two-dimensional Walsh transform is defined using one-dimensional Walsh functions WAL (m, n).

Here, the one-dimensional Walsh functions WAL (m, n) are a system of N one-dimensional functions with period N where a number of data N is a power of 2 and values of m and n are defined by the following formula (1) and formula (2), respectively.

$$m=0, 1, 2, \ldots, N-1 \tag{1}$$

$$n=0, 1, 2, \ldots, N-1 \tag{2}$$

For example, when N=8, there are eight one-dimensional Walsh functions WAL (m, n) as shown in FIGS. 4A to 4H. The one-dimensional Walsh functions WAL (m, n) are generally defined by the following formula (3) to formula (6).

$$WAL\ (0, n)=1\ (n=0, 1, 2, \ldots, N-1) \tag{3}$$

$$WAL\ (1, n)=1\ (n=0, 1, 1, \ldots, (N/2)-1) \tag{4}$$

$$WAL\ (1, n)=-1\ (n=N/2, (N/2)+1, \ldots, N-1) \tag{5}$$

$$WAL\ (m, n)=WAL\ (int\ (m/2), 2n) \times WAL\ (m-2 \times int(m/2), n) \tag{6}$$

Here, int (x) is a function to obtain an integral number for x.

Further, the two-dimensional Walsh functions Wmq (n, k) are defined by the following formula (7), using two types of one-dimensional Walsh functions WAL (m, n) and WAL (q, k).

$$Wmq\ (n, k)=WAL\ (m, n) \times WAL\ (q, k) \tag{7}$$

Figure 5:
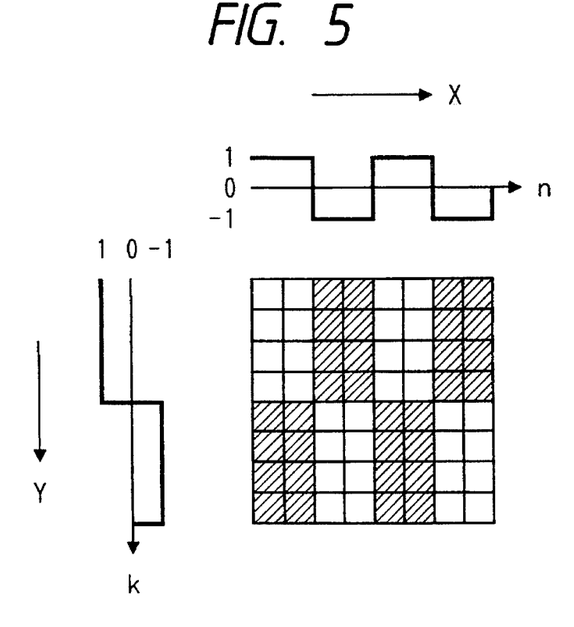
FIG. 5 is an explanatory drawing to show a constitutional example of two-dimensional Walsh functions.

Wmq (n, k) provides a value at a point of X=n and Y=k for X-directional wave number m and Y-directional wave number q, as shown in FIG. 5.

Figure 6:
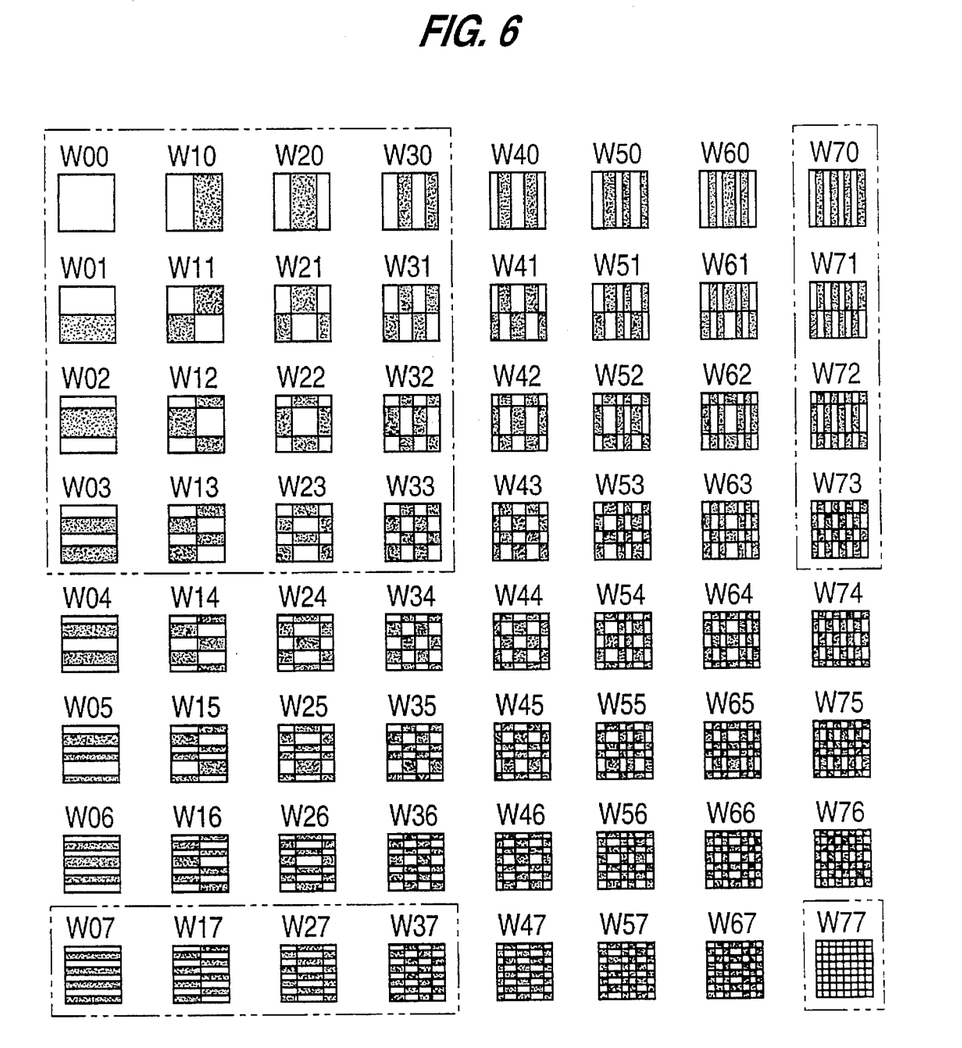
FIG. 6 is an explanatory drawing to show two-dimensional Walsh functions arranged in the order of wave number.
Figure 7A:
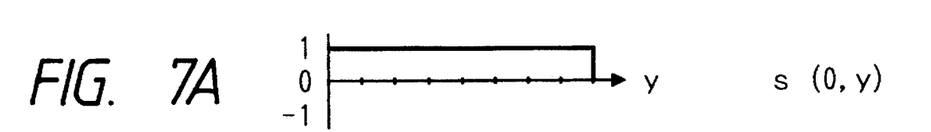
FIGS. 7A to 7E are explanatory drawings to show correlation arithmetic functions of the exposure arithmetic apparatus of FIG. 2.
Figure 7B:
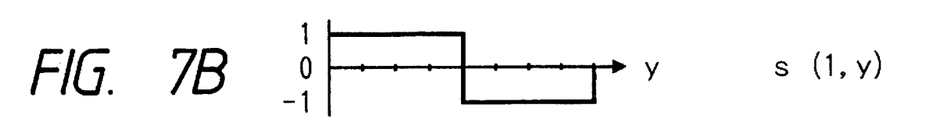
Figure 7C:
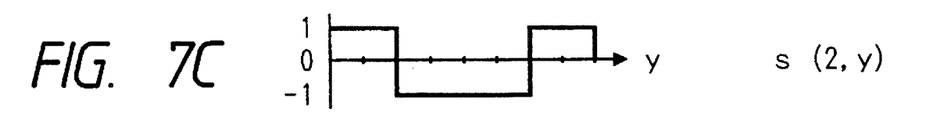
Figure 7D:
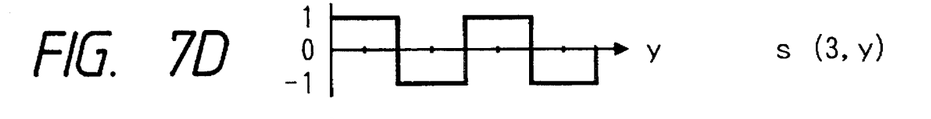
Figure 7E:
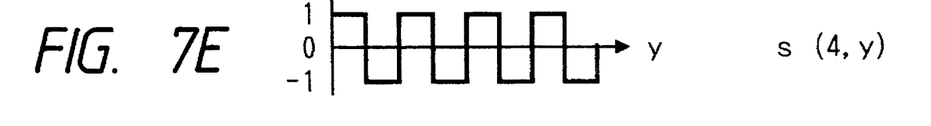

For example, when maximum values N and K for n and k, respectively, each are 8, a group of 64 functions from W00 to W77 as shown in FIG. 6 are attained as the two-dimensional Walsh functions Wmq (n, k).

In FIG. 6, white portions indicate +1 and black portions −1 in the functions of FIG. 5.

Then, using the two-dimensional Walsh functions as shown in FIG. 6 and obtained by formula (7), the two-dimensional Walsh transform is achieved by calculating correlation values between two-dimensional data d (n, k) and the two-dimensional Walsh functions Wmq (n, k).

Incidentally, the two-dimensional data d (n, k) means n×k pieces of data. In this embodiment, it corresponds to the previously described luminance values bv (h, v) of 8×8=64 pieces in FIG. 3.

Here, generally supposing a Walsh transform spectrum for two-dimensional data d (n, k) is G (m, q), it is given by formula (8).

$$G(m,q) = \sum_{n=0}^{N-1} \sum_{k=0}^{K-1} d(n,k) \times Wmq(n,k) \qquad (8)$$

The thus obtained two-dimensional Walsh transform spectrum G (m, q) indicates spatial characteristics of two-dimensional data d (n, k), which is widely used in pattern analysis.

The pattern generating portion 13 generates five one-dimensional Walsh functions s (0, y) to s (4, y) (where y=0 to 7) as shown in FIGS. 7A to 7E, among the eight one-dimensional Walsh functions WAL (0, n) to WAL (7, n) for the number of data N=8 as shown in FIGS. 4A to 4H.

Here, the functions s (0, y), s (1, y), s (2, y), s (3, y), and s (4, y) correspond to the one-dimensional Walsh functions WAL (0, n), WAL (1, n), WAL (2, n), WAL (3, n), and WAL (7, n), respectively, as shown in FIGS. 4A, 4B, 4C, 4D, and 4H, respectively. Thus, excluded are the one-dimensional Walsh functions WAL (4, n), WAL (5, n), and WAL (6, n) shown in FIGS. E, 4F, and 4G, respectively.

This is based on the fact that extraction of features of field is easy with low-frequency spectra because the composition is relatively simple in most photographic scenes.

Also, the high-frequency function s (4, y) is left for extracting relatively special fine patterns such as sunbeams shining through branches of trees.

Then two-dimensional Walsh functions ss (i, j, h, v) are obtained from these functions s (i, h) and s (j, v), using formula (7).

Here, the functions s (i, h) and s (j, v) correspond to the one-dimensional Walsh functions WAL (m, n) and WAL (q, k), respectively, in the previous description of two-dimensional Walsh transform, and the two-dimensional Walsh functions ss (i, j, h, v) correspond to the two-dimensional Walsh functions Wmq (n, k).

Figure 8:
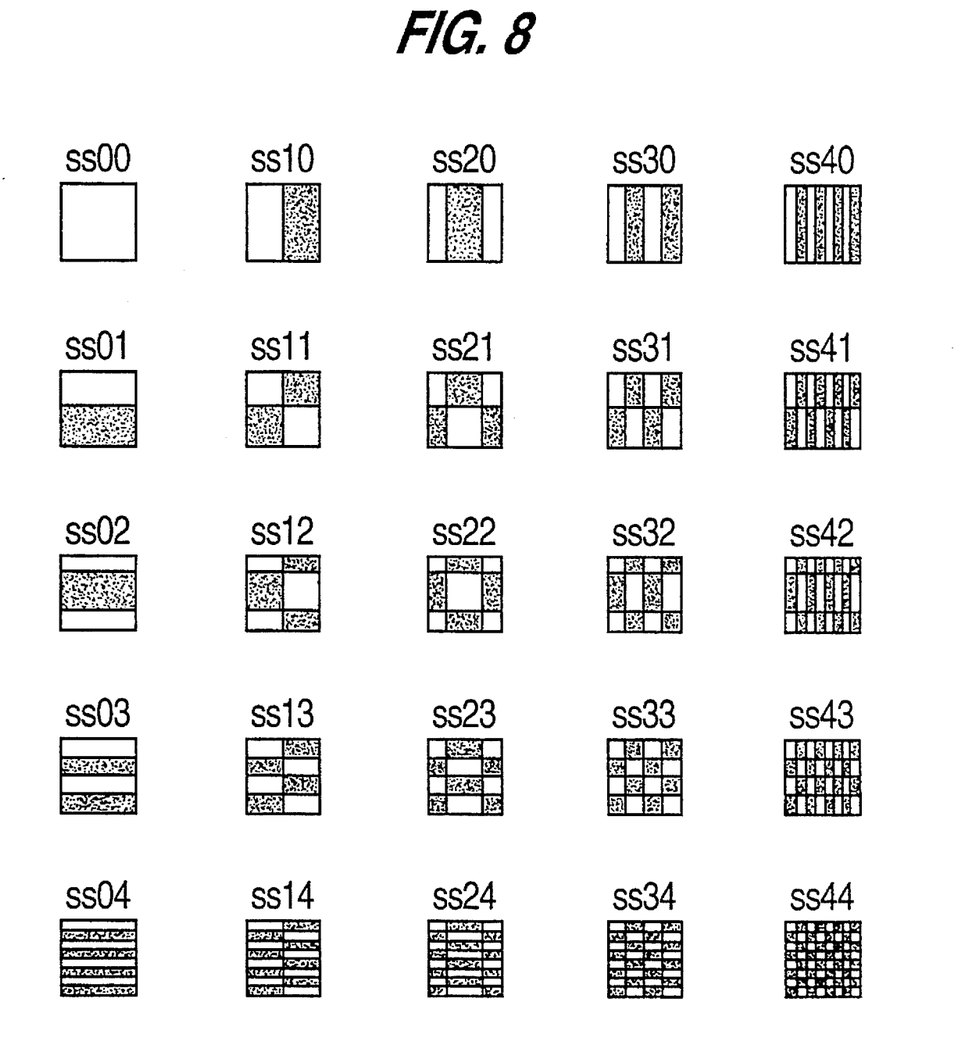
FIG. 8 is an explanatory drawing to show correlation arithmetic functions arranged in the order of wave number, of the exposure arithmetic apparatus of FIG. 2.

FIG. 8 shows luminance patterns of the two-dimensional Walsh functions ss (i, j, h, v), in which for brevity the functions are denoted simply by ssij (where i=0 to 4 and j=0 to 4).

The luminance patterns of two-dimensional Walsh functions ss (i, j, h, v) shown in FIG. 8 correspond to the luminance patterns of 5×5=25 kinds surrounded by the chain double-dashed lines in FIG. 6.

the correlation arithmetic portion 14 obtains two-dimensional Walsh transform spectra p (i, j) (where i=0 to 4 and j=0 to 4) from the luminance values bv (h, v) obtained in the luminance calculating portion 12 and the two-dimensional Walsh functions ss (i, j, h, v) obtained in the pattern generating portion 13, using formula (8).

The two-dimensional Walsh transform spectra p (i, j) correspond to the two-dimensional Walsh transform spectra G (m, q) in the previous description of the two-dimensional Walsh transform.

Here, an absolute value of a two-dimensional Walsh transform spectrum p (i, j) means a degree to which a field scene at the moment of light amount measurement includes one of the luminance pattern components when each spectrum pattern in FIG. 8 is regarded as a field.

Also, the sign of two-dimensional Walsh transform spectrum p (i, j) represents an orientation of brightness of each luminance pattern, which is plus when the orientation of brightness is coincident but minus when it is not coincident.

Describing it in more detail with FIG. 15 previously described, the scene as shown in FIG. 15 shows clear separation of brightness in the upper portion and the lower portion in the field, which is similar to the luminance pattern ss01 of ss (0, 1, h, v) in FIG. 8.

Accordingly, a value of spectrum p (0, 1) with ss (0, 1, h, v) becomes greater than other spectrum values.

Since the scene of FIG. 15 has a bright top side and a dark ground side, the orientation of brightness thereof coincides with that of ss (0, 1, h, v). Thus, the sign of p (0, 1) is plus.

The pattern luminance calculating portion 15 calculates average luminance values bvw (i, j) and bvb (i, j) in respective luminance patterns, using the luminance values bv (h, v) of the luminance calculating portion 12 and the two-dimensional Walsh functions ss (i, j, h, v) of the pattern generating portion 13.

Here, bvw (i, j) represents an average value of luminance values for white portions when the luminance patterns of ss (i, j, h, v) in FIG. 8 are compared with the field, and similarly, bvb (i, j) is an average value of luminance values for black portions.

For example, bvw (0, 1) is an average luminance value of the upper half of the field and bvb (0, 1) an average luminance value of the lower half of the field, as seen from ss01 in FIG. 8.

The details of the pattern luminance calculating portion 15 will be described later using FIGS. 10A and 10B.

The exposure arithmetic portion 16 calculates a correct exposure value BVans, using the two-dimensional Walsh transform spectra p (i, j) of outputs from the correlation arithmetic portion 14 and the outputs bvw (i, j) and bvb (i, j) from the pattern luminance calculating portion 15, in accordance with the following sequence.

First, using the following formula (9), an exposure value BVpt of each luminance pattern is obtained.

$$BVpt = w1 \times bvw + w2 \times bvb + w3 \times bvx + w4 \times bvn + w5 \qquad (9)$$

Here, BVpt (i, j) is described simply by BVpt for brevity. Accordingly, correspondence is as follows: w1 to w1 (i, j); w2 to w2 (i, j); w3 to w3 (i, j); w4 to w4 (i, j); w5 to w5 (i, j); bvw to bvw (i, j); bvb to bvb (i, j) ; bvx to bvx (i, j); bvn to bvn (i, j).

Also, bvx (i, j) and bvn (i, j) represent maximum and minimum values of bvw (i, j) and bvb (i, j), respectively, as indicated by the following formulas (10) and (11).

$$bvx\ (i,\ j) = Max\ (bvw\ (i,\ j),\ bvb\ (i,\ j)) \qquad (10)$$

$$bvn\ (i,\ j) = Min\ (bvw\ (i,\ j),\ bvb\ (i,\ j)) \qquad (11)$$

Also, w1 (i, j) to w4 (i, j) in formula (9) are constants, each indicating a degree to which an average luminance value of each luminance pattern such as bvw (i, j) contributes to an exposure value BVpt (i,j) of each luminance pattern, and w5 (i, j) is a constant term.

These constant values are preliminarily set to appropriate values, for example, by the well-known neuro learning or the like and are written in the program.

Then, using the exposure values BVpt (i, j) in respective luminance patterns, the correct exposure value BVans is calculated as indicated by formula (12).

$$BVans = \sum_{i=0}^{4} \sum_{j=0}^{4} \{Abs\{p(i,j)\} \times Bvpt(i,j)\} / \sum_{i=0}^{4} \sum_{j=0}^{4} Abs\{p(i,j)\} \qquad (12)$$

Here, Abs (x) is a function for obtaining an absolute value of x.

Figure 9:
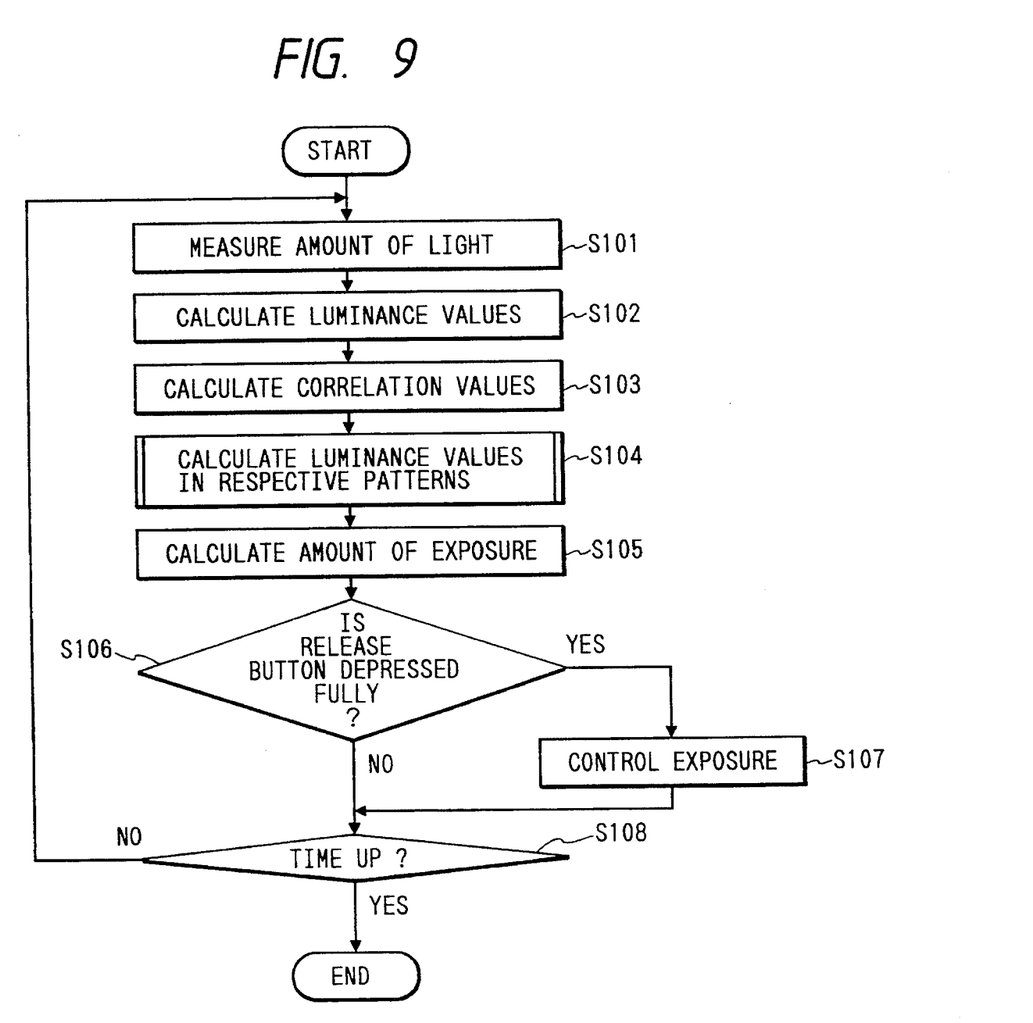
FIG. 9 is a flowchart to show a main algorithm of the exposure arithmetic apparatus of FIG. 2.
Figures 10, 10A:
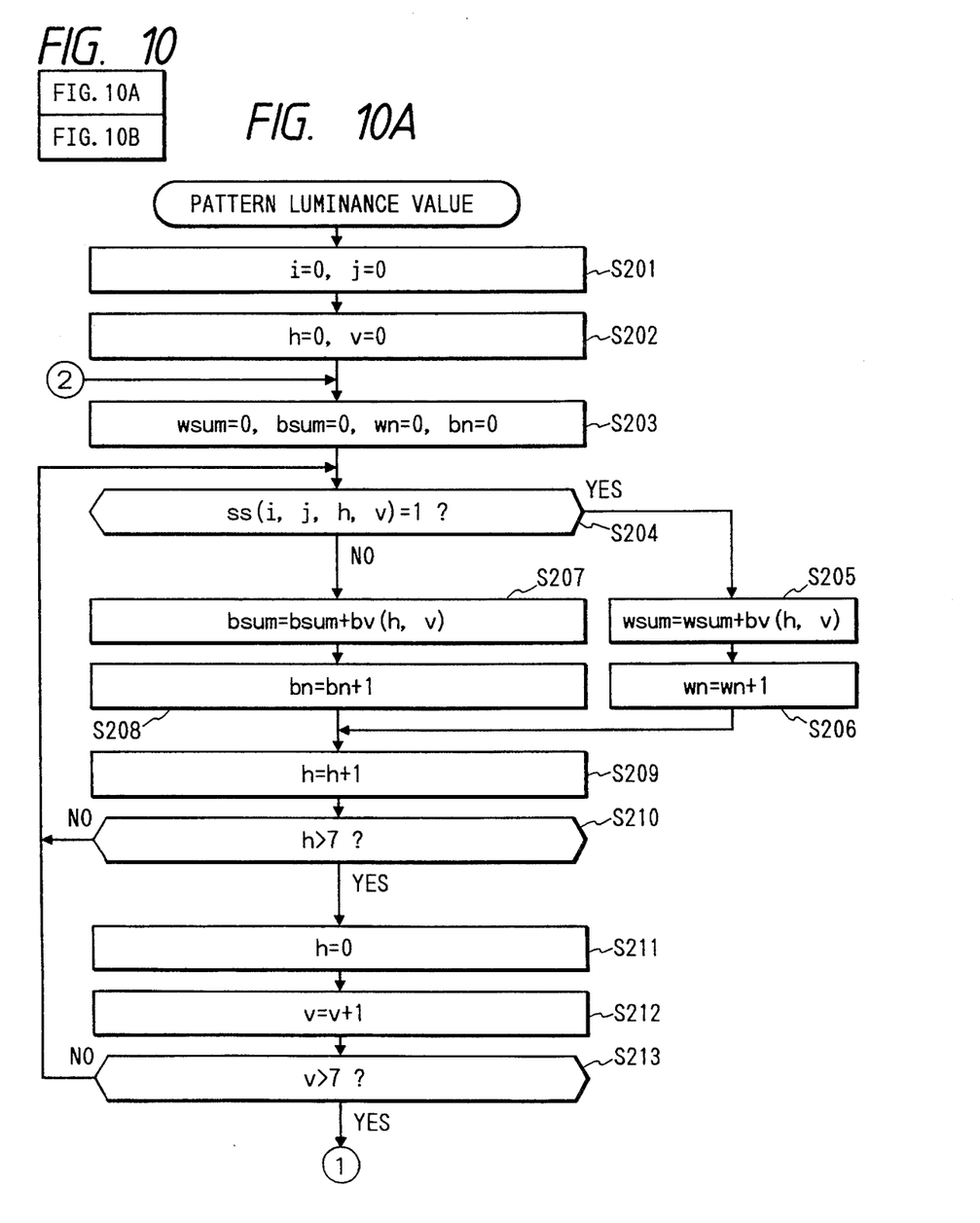
Figure 10B:
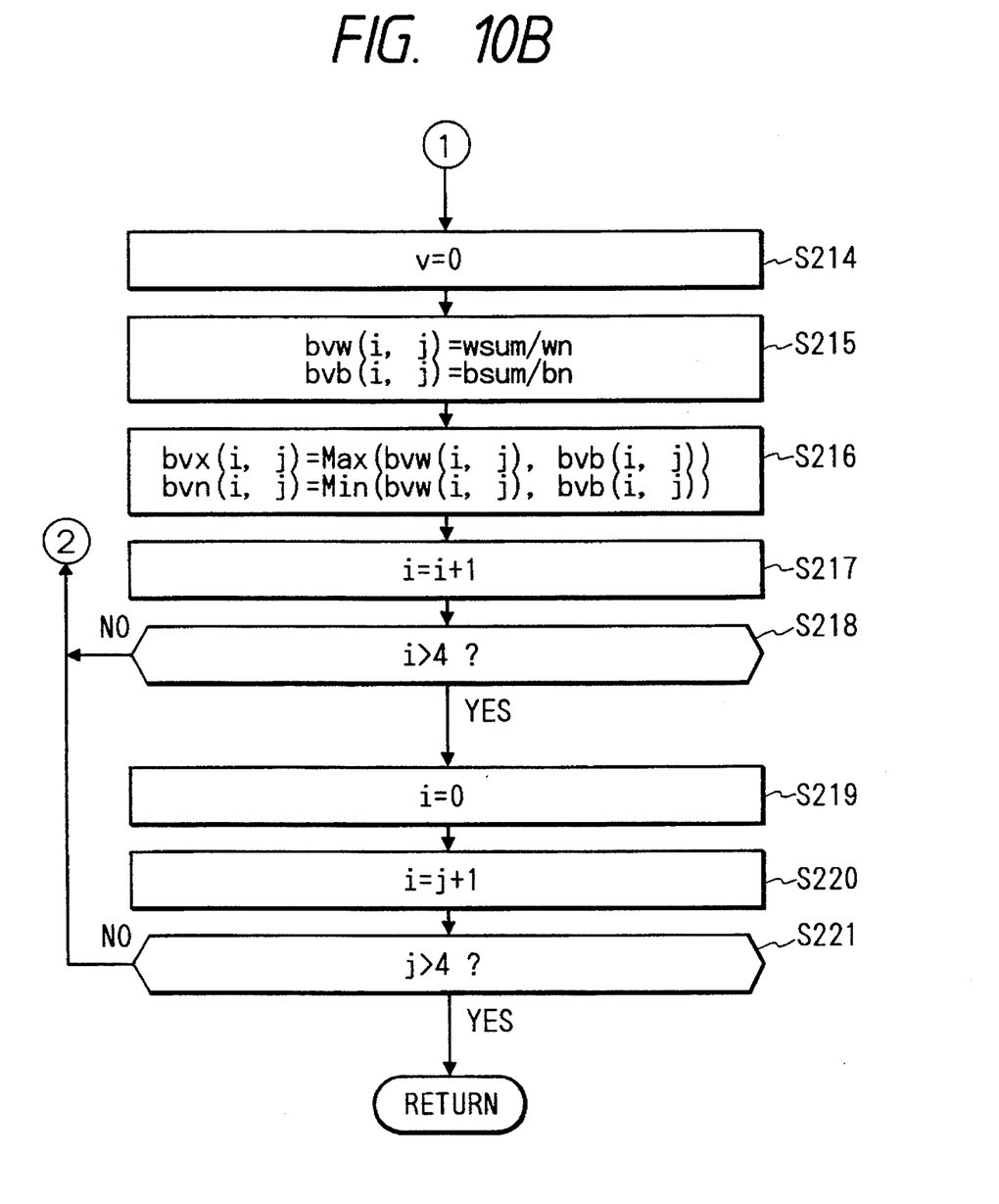

Next, the program in MPU 11 is described in detail using the flowcharts shown in FIG. 9 and FIGS. 10A and 10B.

Initially, when an unrepresented release button set in the camera is half pressed, a power switch of camera is turned on to start a half-press timer so as to perform the main algorithm shown in FIG. 9.

First, the light amount measuring portion 10 performs measurement of amount of light of the field to obtain light amount data of 64 zones (step S101).

Next, the luminance calculating portion 12 calculates the luminance values bv (h, v) from the respective light amount data of 64 zones (step S102).

Then the correlation arithmetic portion 14 performs the correlation calculation by the above method to calculate 25 correlation values, i.e., 25 two-dimensional Walsh transform spectra p (i, j) (where i=0 to 4 and j=0 to 4) (step S103).

In the next place, the pattern luminance calculating portion 15 calculates bvw (i, j), bvb (i, j), bvx (i, j), and bvn (i, j) (where i =0 to 4 and j=0 to 4) (step S104).

After that, using the values obtained at step S103 and step S104, the correct exposure value BVans is calculated by formula (9) to formula (12) (step S105).

Then it is determined whether the release button not shown is fully depressed (step S106). When it is depressed fully, exposure is controlled based on the correct exposure value BVans (step S107).

When the release button is not pressed fully yet, it is determined whether the time of the half-press timer is up (step S108). Unless the time is up, the flow returns to step S101 to continue the processing. If the time is up then the program ends.

Next, the operation of the pattern luminance calculating portion 15 is described in detail using the flowchart shown in FIGS. 10A and 10B.

When step S104 in the main algorithm shown in FIG. 9 is executed, the subroutine algorithm of FIGS. 10A and 10B is started to begin processing.

First, 0 is put into i and j (step S201) and then 0 is put into h and v (step S202).

Next, 0 is put into each of wsum, bsum, wn, and bn (step S203).

It is then determined whether the two-dimensional Walsh function ss (i, j, h, v) is 1 (step S204). If it is 1, a process with the following formula (13) is executed (step S205) and thereafter 1 is added to wn (step S206).

$$wsum = wsum + bv\ (h, v) \qquad (13)$$

Unless the two-dimensional Walsh function ss (i, j, h, v) is 1, that is, if it is −1, a process with the following formula (14) is executed (step S207) and thereafter 1 is added to bn (step S208).

$$bsum = bsum + bv\ (h, v) \qquad (14)$$

Subsequently, 1 is added to h (step S209) and thereafter it is determined whether h is greater than 7 (step S210). If the answer is no, the flow returns to the process at step S204; if the answer is yes, h is cleared to 0 (step S211).

Next, 1 is added to v (step S212) and thereafter it is determined whether v is greater than 7 (step S213).

If the answer is no, the flow returns to step S204; if the answer is yes, v is cleared to 0 (step S214).

Then the average luminance values bvw (i, j) and bvb (i, j) are calculated for each luminance pattern by the following formula (15) and formula (16) (step S215).

$$bvw\ (i,\ j) = wsum/wn \qquad (15)$$

$$bvb\ (i,\ j) = bsum/bn \qquad (16)$$

Here, with the luminance pattern of ss00 in FIG. 8, wn is 64 and bn is 0, so that bvb (i, j) is made to be 0.

Next, bvx (i, j) and bvn (i, j) are calculated by the previously described formulas (10) and (11) (step S216).

After that, 1 is added to i (step S217) and then it is determined whether i is greater than 4 (step S218). If the answer is no, the flow returned to the process at step S203; if the answer is yes, i is cleared to 0 (step S219).

Subsequently, 1 is added to j (step S220) and thereafter it is determined whether j is greater than 4 (step S221). If the answer is no, the flow returns to step S203; if the answer is yes, the processing ends.

As described, the above exposure arithmetic apparatus is so arranged that the correlation arithmetic portion 14 calculates the correlation values in respective patterns, of the field, the pattern luminance calculating portion 15 calculates the luminance values in the respective patterns, and the exposure arithmetic portion 15 calculates the correct exposure, based on outputs from the portions 14 and 15, whereby the field can be readily patterned in any field scene and an accurate amount of correct exposure can be provided based thereon.

Also, because the correct exposure value can be attained by multiplying the correlation values obtained by the correlation arithmetic portion 14, by exposure amounts of the respective patterns, the arithmetic operation can be easily and rapidly executed.

Further, because the measurement of light amount is arranged to be performed by the storage-type light amount measuring element 9, the number of segments for measurement of light amount can be set as to be large.

Also, because the pattern generating portion 13 is arranged to generate the patterns based on the two-dimensional Walsh transform, patterning of field can be carried out more properly.

Although the embodiment as detailed above described an example in which the correlation calculation was carried out based on the technique of two-dimensional Walsh transform, it is intended that the present invention not be limited to the embodiment but that the correlation calculation can be executed using any other method, for example, the two-dimensional Fourier transform, the discrete cosine transform, the discrete sine transform, etc.

Next described is the second embodiment of the exposure arithmetic apparatus mounted in the camera according to the present invention.

Figure 11:
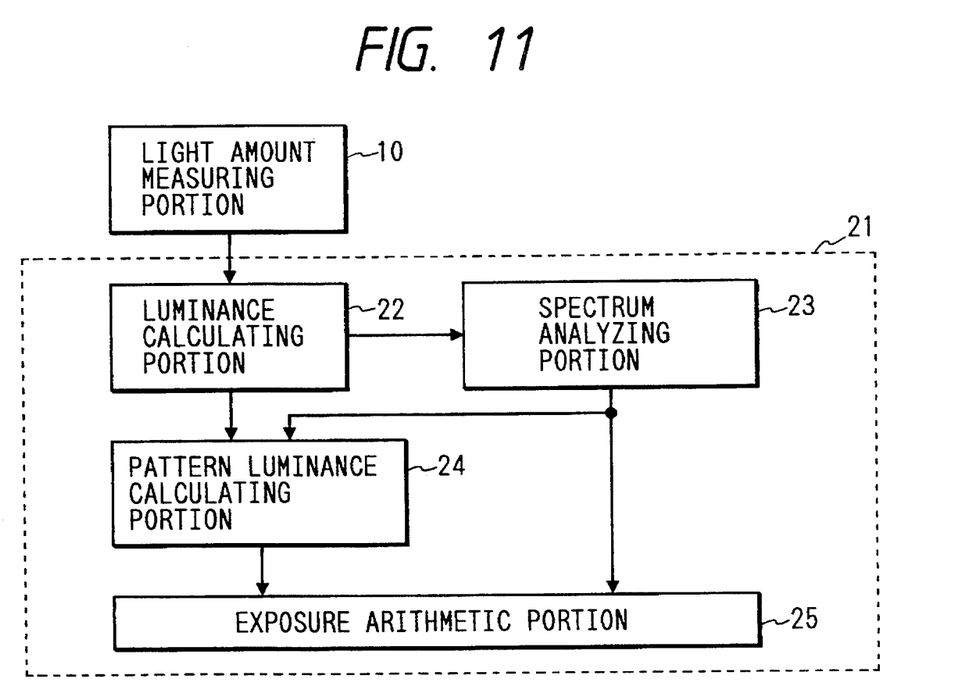
FIG. 11 is a block diagram to show the structure of the second embodiment of the exposure arithmetic apparatus mounted in the camera shown in FIG. 1.

FIG. 11 is a block diagram of another embodiment of the exposure arithmetic apparatus mounted in the camera shown in FIG. 1.

The exposure arithmetic apparatus of this embodiment is also composed of a light amount measuring portion 10 for measuring an amount of light of a field and a micro processing unit (MPU) 21 set in the camera, similarly as in the first embodiment as described above and shown in FIG. 2.

The light amount measuring portion 10 is the same as that in the first embodiment and thus is omitted to explain herein.

MPU 21 executes all controls in the camera by the program written therein. A luminance calculating portion 22, a spectrum analyzing portion 23, a pattern luminance calculating portion 24, and an exposure arithmetic portion 25 all are realized by the program in MPU 21.

The luminance calculating portion 22 receives light amount data of respective zones obtained by the light amount measuring portion 10, similarly as the luminance calculating portion 12 in the first embodiment, to convert 64 light amount data into luminance values and then to put them into bv (h, v) (where h=0 to 7 and v=0 to 7).

Here, similarly as in the first embodiment, bv (0, 0) represents a luminance value of the left upper end zone in FIG. 3 and bv (7, 7) a luminance value of the right lower end zone.

The spectrum analyzing portion 23 performs spectrum analysis of the field using the previously described technique of the two-dimensional Walsh transform, based on outputs from the luminance calculating portion 22.

In the spectrum analyzing portion 23 five types of one-dimensional Walsh functions s (0, y) to s (4, y) (where y=0 to 7) suitable for extraction of features of the field as shown in FIGS. 7A to 7E are used among the eight types of one-dimensional Walsh functions WAL (0, n) to WAL (7, n) for the number of data n=8 as shown in FIGS. 4A to 4H.

Here, the functions s (0, y), s (1, y), s (2, y), s (3, y), and s (4, y) correspond to the one-dimensional Walsh functions WAL (0, n), WAL (1, n), WAL (2, n), WAL (3, n), and WAL (7, n), respectively, shown in FIGS. 4A, 4B, 4C, 4D and 4H, respectively. Excluded are the one-dimensional Walsh functions WAL (4, n), WAL (5, n), and WAL (6, n) shown in FIGS. 4E, 4F, and 4G, respectively.

This is based, as described previously, on the fact that extraction of features of field is easy with low-frequency spectra because the composition is relatively simple in most photographic scenes.

Also, the high-frequency function s (4, y) is left for extracting relatively special fine patterns such as sunbeams shining through branches of trees.

Then two-dimensional Walsh functions ss (i, j, h, v) are obtained from these functions s (i, h) and s (j, v), using formula (7).

Here, the functions s (i, h) and s (j, v) correspond to the one-dimensional Walsh functions WAL (m, n) and WAL (q, k), respectively, in the previous description of two-dimensional Walsh transform, and the two-dimensional Walsh functions ss (i, j, h, v) correspond to the two-dimensional Walsh functions Wmq (n, k).

FIG. 8 shows luminance patterns of the two-dimensional Walsh functions ss (i, j, h, v), in which for brevity the functions are denoted simply by ssij (where i=0 to 4 and j=0 to 4).

The luminance patterns of two-dimensional Walsh functions ss (i, j, h, v) shown in FIG. 8 correspond to the luminance patterns of 5×5=25 kinds surrounded by the chain double-dashed lines in FIG. 6.

Further, the spectrum analyzing portion 23 obtains the two-dimensional Walsh transform spectra p (i, j) (where i=0 to 4 and j=0 to 4) from the luminance values bv (h, v) obtained in the luminance calculating portion 22 and the two-dimensional Walsh functions ss (i, j, h, v) obtained above, using formula (8).

As described previously, the two-dimensional Walsh transform spectra p (i, j) correspond to the two-dimensional Walsh transform spectra G (m, q) in the previous description of the two-dimensional Walsh transform.

The pattern luminance calculating portion 24 calculates average luminance values bvw (i, j) and bvb (i, j) in respective luminance patterns, using the luminance values bv (h, v) of the luminance calculating portion 22 and the two-dimensional Walsh functions ss (i, j, h, v) of the spectrum analyzing portion 23.

Here, bvw (i, j) is, as described previously, an average value of luminance values for white portions when the luminance patterns of ss (i, j, h, v) in FIG. 8 are compared with the field, and similarly, bvb (i, j) is an average value of luminance values for black portions.

Since this pattern luminance calculating portion 24 is the same as the pattern luminance calculating portion 15 in the first embodiment, the detailed description thereof is omitted.

The exposure calculating portion 25 calculates the correct exposure value BVans, using the two-dimensional Walsh transform spectra p (i, j) output from the spectrum analyzing portion 23 and the outputs bvw (i, j) and bvb (i, j) from the pattern luminance calculating portion 24. Since the calculation procedure is the same as that executed by the exposure arithmetic portion 16 in the first embodiment as described previously, the description thereof is omitted.

Figure 12:
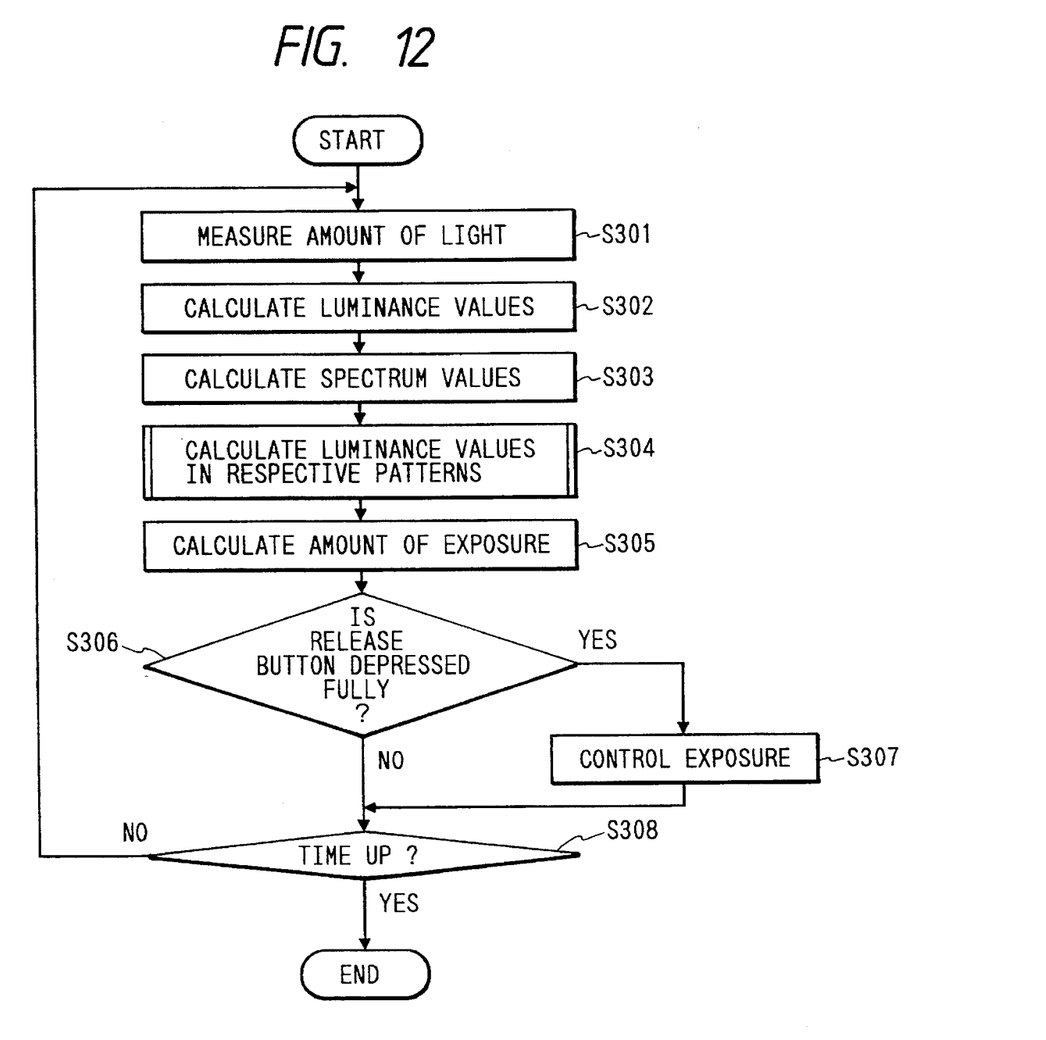
FIG. 12 is a flowchart to show a main algorithm of the exposure arithmetic apparatus of FIG. 11.

Next, the program in the micro processing unit 21 is described in detail using the flowchart shown in FIG. 12.

Initially, when the unrepresented release button set in the camera is half pressed, the power switch of camera is turned on to start the half-press timer so as to execute the main algorithm shown in FIG. 12.

First, the light amount measuring portion 10 executes measurement of light amount of the field to obtain light amount data of 64 zones (step S301).

Next, the luminance calculating portion 22 calculates the luminance values bv (h, v) from the respective light amount data of 64 zones (step S302).

Then the spectrum analyzing portion 23 executes the spectrum analysis by the above-described method to calculate 25 spectrum values, i.e., 25 two-dimensional Walsh transform spectra p (i, j) (where i=0 to 4 and j=0 to 4) (step S303).

Next, the pattern luminance calculating portion 24 calculates bvw (i, j), bvb (i, j), bvx (i, j), and bvn (i, j) (where i=0 to 4 and j=0 to 4) by the subroutine algorithm shown in FIGS. 10A and 10B (step S304).

After that, using the values obtained at step S303 and step S304, the correct exposure value BVans is calculated by formula (9) to formula (12) (step S305).

Subsequently, it is determined whether the unrepresented release button is fully depressed (step S306). If it is fully depressed, exposure is controlled based on the correct exposure value BVans (step S307).

On the other hand, unless it is fully depressed, it is determined whether the time of the half-press timer is up or not (step S308). If the time is not up yet, the flow returns to step S301 to continue the processing; if the time is up then the program ends.

As described, the above exposure arithmetic apparatus is so arranged that the spectrum analyzing portion 23 calculates a specific number, preliminarily selected, of spectrum values, and the exposure calculating portion 25 calculates the correct exposure amount, based on these spectrum values, whereby the field can be readily patterned for any field scene and an accurate value of correct exposure can be quickly provided based thereon.

Also, because the measurement of light amount is executed by the storage-type light amount measuring element 9, the number of segments for measurement of light amount can be set as to be large.

Further, because the measurement of light amount is carried out while splitting the field in a matrix, the spectrum analysis becomes easy.

Also, because the numbers of horizontal and vertical segments of the field split in a matrix are determined as a power of 2, the spectrum analysis becomes easy.

Further, since the spectrum analysis is carried out based on the two-dimensional Walsh transform, the spectrum analysis can be performed at high speed.

Additionally, because the above-described exposure arithmetic apparatus is arranged to select spectrum values mainly in the low-frequency region as the specific number of spectrum values, the features of field can be extracted with good efficiency.

Although the above embodiment described an example in which the spectrum arithmetic operation was carried out based on the technique of two-dimensional Walsh transform, it is intended that the present invention not be limited to the embodiment but that the spectrum arithmetic operation can be performed using any other technique, for example, the two-dimensional Fourier transform, the discrete cosine transform, the discrete sine transform, etc., of course.

For example, where the two-dimensional discrete Fourier transform is employed, the following formula (17) may be used instead of formula (8).

$$G(m,q) = \sum_{n=0}^{N-1} \sum_{k=0}^{K-1} d(n,k) \times EXP(-j2\pi nm/N) EXP(-j2\pi kQ/K) \quad (17)$$

Since a solution of the formula (17) is a complex number, a spectrum value can be a power spectrum value which is a square sum of a real part and a virtual part or an amplitude spectrum value which is a square root thereof.

As an equation corresponding to ss (i, j, h, v) the following formula (18) obtained by expansion of formula (17) can be employed.

$$ss\ (i, j, h, v) = COS(2\pi\theta) \times COS(2\pi\theta) + SIN(2\pi\theta) \times SIN(2\pi\theta) \quad (18)$$

Here, θ in this equation is given by the following formula (19).

$$\theta = (h \times i/H) + (v \times j/V) \quad (19)$$

Here, H and V are numbers of horizontal and vertical segments, respectively, of the light amount measuring element 9.

Therefore, it is intended that the invention not be limited to the particular embodiments disclosed as the best mode contemplated for carrying out this invention, but that the invention will include all embodiments falling within the scope of the appended claims.

What is claimed is:

1. A camera provided with an exposure arithmetic apparatus, wherein said exposure arithmetic apparatus comprises:

a light amount measuring device for measuring an amount of light for each of a plurality of segmental zones in a field;

a pattern generating device for generating a plurality of patterns for spatially pattern-classifying said field;

a correlation arithmetic device for calculating correlation values, each representing a degree of correlation of said each pattern with said field, based on outputs from said light amount measuring device and said pattern generating device;

a pattern luminance calculating device for performing an arithmetic process based on the output from said pattern generating device, of the output from said light amount measuring device; and an exposure arithmetic device for performing an arithmetic operation of correct exposure, based on outputs from said correlation arithmetic device and said pattern luminance calculating device.

2. A camera according to claim 1, wherein said exposure arithmetic device obtains pattern exposure values which are correct exposure values in the respective patterns, using said luminance values in the respective patterns obtained by said pattern luminance calculating device, and obtains a correct exposure value by multiplying said respective pattern exposure values by said correlation values obtained by said correlation arithmetic device.

3. A camera according to claim 2, wherein said light amount measuring device performs measurement of light amount by a storage-type light amount measuring element.

4. A camera according to claim 3, wherein said pattern generating device generates patterns based on the two-dimensional Walsh transform.

5. A camera provided with an exposure arithmetic apparatus, wherein said exposure arithmetic apparatus comprises:

a light amount measuring device for measuring an amount of light for each of a plurality of segmental zones in a field;

a spectrum analyzing device for performing spectrum analysis of said field using an output from said light amount measuring device; and an exposure arithmetic device for performing an arithmetic operation of correct exposure based on outputs from said light amount measuring device and said spectrum analyzing device;

wherein said spectrum analyzing device performs spectrum analysis of said field, using a specific number of spectrum values preliminarily selected from a plurality of spectrum values determined depending upon a number of segmental zones in said light amount measuring device.

6. A camera according to claim 5, wherein said light amount measuring device performs measurement of light amount by a storage-type light amount measuring element.

7. A camera according to claim 6, wherein said light amount measuring device performs measurement of light amount while splitting said field in a matrix of segmental zones.

8. A camera according to claim 7, wherein said light amount measuring device employs a power of 2 for at least one of a number of horizontal segments and a number of vertical segments of said field split in said matrix.

9. A camera according to claim 8, wherein said spectrum analyzing device performs spectrum analysis based on the two-dimensional Walsh transform.

10. A camera according to claim 9, wherein said specific number of spectrum values preliminarily selected by said spectrum analyzing device are spectrum values mainly in a low frequency region.

* * * * *